Patented Feb. 3, 1948

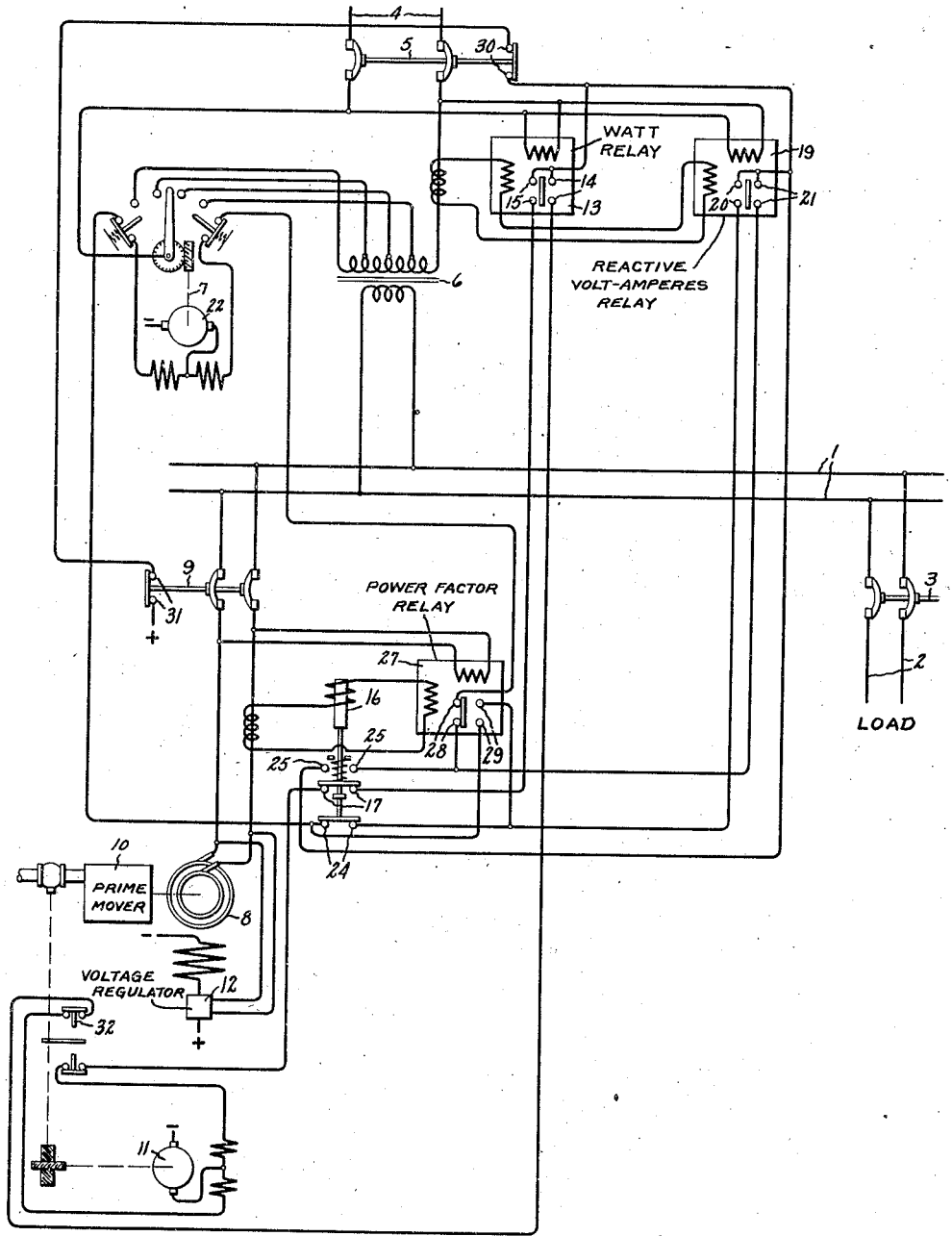

2,435,419

UNITED STATES PATENT OFFICE 2,435,419

POWER AND REACTIVE VOLT-AMPERE REGULATING ARRANGEMENTS FOR PARALLEL-CONNECTED ALTERNATING CURRENT SOURCES

Herman Bany, Lansdowne, Pa., assignor to General Electric Company, a corporation of New York Application October 30, 1946, Serial No. 706,757

12 Claims. (Cl. 290—4)

My invention relates to arrangements for regulating the relative amounts of power and reactive volt-amperes supplied to a common load circuit by two parallel-connected sources of alternating current. My invention relates particularly to such a regulating arrangement where one of the sources is a local generating station and the other source is a power system from which electric energy is purchased under such conditions that it is desirable to have the power system supply the entire power or watt demand of the load up to a predetermined value and to have the local generator supply, until its full-rated volt-ampere capacity is reached, the entire reactive volt-ampere demand of the load and any power demand of the load in excess of said predetermined value. In such a regulating arrangement, it is sometimes desirable, when the output of the local generator has reached its full-rated volt-ampere capacity, to divide the reactive volt-ampere demand of the load between the sources so as to cause any additional power demand of the load to be supplied by the local generator until the power output thereof is equal to its full volt-ampere rating and then to cause the power system to supply any additional power or reactive volt-ampere demand of the load while the power output of the local generator is maintained equal to its full volt-ampere rating. An object of my invention is to provide a regulating arrangement for controlling the voltage of one of the parallel-connected sources in such an electric system and also the power or watt output of one of the sources so as to accomplish such a division, between the two sources, of the power and the volt-ampere demand of the load.

My invention will be better understood from the following description when taken in consideration with the accompanying drawing, the single figure of which diagrammatically illustrates an embodiment of my invention in connection with a regulating arrangement, for two parallel-connected alternating current sources supplying a common load bus, and the scope of my invention will be pointed out in the appended claims.

Referring to the drawing, 1 represents a load bus supplying a load circuit 2 through a suitable circuit breaker 3. The load bus 1 is supplied with electric energy from a supply circuit 4 through a suitable circuit breaker 5 and a suitable tap changing transformer 6. As shown, the transformer 6 is provided with a motor-operated tap changer 7 for varying the number of active primary turns so as to change the voltage ratio of the transformer. The load circuit 2 is also supplied with electric energy from a local synchronous generator 8 which is connected to the load circuit 2 through a suitable circuit breaker 9 which is driven by a suitable prime mover 10 such as a fluid-operated turbine. The power output of the generator 8 is controlled by means of a reversible motor 11 which controls in any well-known manner the amount of fluid energy supplied to the prime mover 10. The generator 8 is provided with a voltage regulator 12 of any suitable type for automatically maintaining the terminal voltage of the generator 8 at a predetermined value.

In order to cause the supply circuit 4 to supply the power or watt demand of the load connected to the load bus 1 as long as this demand is below a predetermined value and to cause the local generator 8 to supply any watt or power demand of the load in excess of this predetermined value, I provide a contact-making watt relay 13 which is connected to the supply circuit 4 in any suitable manner well known in the art so that the contacts 14 of the relay 13 are closed when the wattage supplied by the supply circuit 4 to the load bus 1 is below a predetermined value and the contacts 15 of the relay 13 are closed when the wattage supplied by the supply circuit 4 is above this predetermined value and neither the contacts 14 nor 15 are closed when the watts being supplied by the supply circuit 4 are at this predetermined value. The contacts 14 when closed complete a circuit for the reversible motor 11 so as to effect a decrease in the supply of fluid energy to the prime mover 10 and thereby decrease the power output of the generator 8. The contacts 15 when closed complete a circuit for the reversible motor 11 so as to effect an increase in the supply of fluid energy to the motor 11 and thereby increase the power output of the generator 8.

In order to limit the output of the generator 8 to its full-rated volt-ampere capacity, an overcurrent relay 16 is connected in any suitable manner in the output circuit of the generator 8 and is provided with contacts 17 which are connected in series with the contacts 15 of the watt relay 13 and which are arranged to be opened when the current output of the generator 8 exceeds a predetermined value. Since the generator voltage is held at a constant value by the voltage regulator 12, it is obvious that a series overcurrent relay can be used as a maximum volt-ampere relay for the generator 8.

Also, in order to cause the generator 8 to supply the reactive volt-ampere demand of the load as long as the volt-ampere output of the generator is below its rated capacity, I also provide a reactive volt-ampere relay 19 which is connected to the supply circuit 4 in any suitable manner so that the contacts 20 of the relay 19 are closed when the reactive volt-amperes supplied to the load bus 1 by the supply circuit 4 exceed a predetermined value, and the contacts 21 of the relay 19 are closed when the reactive volt-amperes supplied to the load circuit by the supply circuit 4 are below this predetermined value, and both contacts are open when the volt-amperes are at this predetermined value, and both contacts are open when the volt-amperes are at this predetermined value. The contacts 20 control a circuit for the reversible motor 22 of the transformer tap changer 7 so that the tap changer is operated to decrease the output voltage of the transformer 6 when the contacts 20 are closed, whereas the contacts 21 control a circuit for reversible motor 22 so that the tap changer 7 is operated to increase the output voltage of the transformer 6 when the contacts 21 are closed. It will be readily understood by those skilled in the art that, since the voltage of the generator 8 is maintained constant by its voltage regulator 12, an increase in the output voltage of the transformer 6 effects an increase in the proportion of the load reactive volt-amperes being supplied by the supply circuit 4 and a decrease in the proportion of the load reactive volt-amperes being supplied by the generator 8, whereas a decrease in the output voltage of the transformer 6 effects a decrease in the proportion of the load reactive volt-amperes being supplied by the supply circuit 4 and an increase in the proportion of the load reactive volt-amperes being supplied by the generator 8.

In case the demand of the load is such that it causes the generator 8 to deliver its full-rated volt-amperes, it is desirable that the reactive volt-ampere output of the generator 8 be shifted to the supply circuit so as to make the watt output of the generator 8 equal to its full-rated volt-ampere output. This result is accomplished by connecting the normally closed contacts 24 of the overcurrent relay 16 in series with the contacts 20 of the reactive volt-ampere relay 19 and the normally open contacts 25 of the overcurrent relay 16 in parallel with the contacts 21 of the reactive volt-ampere relay 19. Therefore, when the volt-ampere output of the generator 8 is sufficient to cause the relay 16 to open its contacts 24 and close its contacts 25, the relay 19 cannot complete a circuit for the motor 22 to effect an operation of the tap changer 7 to lower the output voltage of the transformer 6 and a circuit is completed for the motor 22 of the tap changer 7 to increase the output voltage of the transformer 6, thereby increasing the proportion of the reactive volt-ampere demand of the load being supplied by the supply circuit 4.

When the load demand is such that the watt output of the generator 8 is equal to its full volt-ampere rating, it is desirable to have the supply circuit 4 then furnish the entire reactive volt-ampere demand of the load as well as all of the watt demand of the load in excess of what is being supplied by the generator 8. In accordance with the embodiment of my invention shown in the drawing, I accomplish this result by connecting a power factor relay 27 to the output circuit of the generator 8 in any suitable manner so that the contacts 28 of the relay 27 are closed while the generator is overexcited and supplying reactive volt-amperes to the load bus, and the contacts 29 of the relay 27 are closed while the generator 8 is underexcited and is supplying capacitive volt-amperes to the load bus, and both of the contacts 28 and 29 are open when the power factor of the generator 8 is unity. The contacts 28 are connected in series with the parallel-connected contacts 21 and 25 of the reactive volt-ampere relay 19 and the overcurrent relay 16, respectively, so that the relays 19 and 16 can control the motor-operated tap changer 7 to increase the proportion of the reactive volt-amperes of the load being supplied by the supply circuit 4 only while the generator 8 is overexcited and therefore supplying reactive volt-amperes to the load. The contacts 29 of the power factor relay 27 are connected in parallel with the contacts 24 of the overcurrent relay 16 so that if the power factor of the generator 8 becomes leading while the supply circuit 4 is supplying reactive volt-amperes, the tap changer 7 is operated to reduce the output voltage of the transformer 6 thereby decreasing the reactive volt-amperes being supplied by the supply circuit 4 and restoring the power factor of the generator 8 to unity.

In order to render the control arrangement operative only when both the supply circuit 4 and the generator 8 are connected to the load bus 1, the control circuits for the motors 22 and 11 include the series-connected auxiliary contacts 30 and 31 of the circuit breakers 5 and 9, respectively. These contacts 30 and 31 are closed only when the respective circuit breakers 5 and 9 are closed.

The operation of the embodiment of my invention shown in the drawing will be obvious from the above description. When both the circuit breakers 5 and 9 are closed and the watt demand of the load is below the predetermined value which causes watt relay 13 to close its contacts 14, a circuit is completed for the motor 11 through the contacts 14 to cause the amount of fluid energy supplied to the prime mover 10 to be reduced to a predetermined value determined by a limit switch 32 which is arranged to be opened by the motor 11 when it has reduced the prime mover fluid energy supply to this predetermined value. Therefore, under these conditions, the supply circuit 4 supplies the entire watt demand of the load. Any reactive volt-ampere demand of the load which is sufficient to cause the reactive volt-ampere relay 19 to close its contacts 20 results in the completion of the circuit of the motor 22 through the contact 24 of the overcurrent relay 16 so that the tap changer 7 is operated to reduce the output voltage of the transformer 6, thereby causing the volt-ampere demand of the load in excess of the value required to cause the relay 19 to close its contacts 20 to be supplied by the generator 8.

When the watt demand of the load increases to the predetermined value which causes the watt relay 13 to open its contacts 14 and close its contacts 15, a circuit is then completed through the contacts 15 of the relay 13 and the contacts 17 of the overcurrent relay 16 to cause the motor 11 to operate in a direction to increase the amount of fluid energy supplied to the prime mover 10, thereby causing the generator 8 to supply the watt demand of the load in excess of said predetermined value while the watt output of the supply circuit 4 is maintained at said predetermined value.

When the watt and reactive volt-ampere demand of the load increases to such a value that the volt-ampere output of the generator 8 is sufficient to cause the overcurrent relay 16 to open its contacts 17 and 24 and close its contacts 25, the opening of the contacts 17 prevents the motor 11 from being operated to effect an increase in the watt output of the generator 8, the opening of the contacts 24 prevents the tap changer 7 from being operated to lower the output voltage of the transformer 6, and the closing of the contacts 25 completes through contacts 28 of the power factor relay 27 a circuit for the motor 22 to operate the tap changer 7 so as to increase the output voltage of the transformer 6 and thereby increase the proportion of the reactive volt-ampere demand of the load being supplied by the supply circuit 4 and decrease the reactive volt-amperes being supplied by the generator 8. As soon as a sufficient number of reactive volt-amperes has been unloaded from the generator 8 to the supply circuit 4, overcurrent relay 16 opens its contacts 25 and closes its contacts 17 so that the motor 11 is operated to effect an increase in the watt output of the generator 8 until the volt-ampere output of the generator 8 is again sufficient to cause the overcurrent relay 16 to open its contacts 17 and close its contacts 25. In this manner, the control arrangement operates to unload the reactive volt-amperes gradually from the generator 8 to the supply circuit 4 until the watt output of the generator becomes equal to its full-rated volt-ampere capacity at which time the power factor of the generator is unity.

In order to prevent the contacts 29 of the reactive volt-ampere relay 19 from completing a circuit for the motor 22 to effect an increase in the reactive volt-amperes being supplied by the supply circuit 4 after the closing of the contacts 25 of the overcurrent relay 16 has effected a sufficient transfer of reactive volt-amperes from the generator 8 to the supply circuit 4 to cause the overcurrent relay 16 to reclose its contacts 17, the relay 16 is arranged in any suitable manner, examples of which are well known in the art, so that it opens and closes its contacts 24 at a slightly lower value of current than the value at which it opens and closes its contacts 17 and 25.

When the watt output of the generator 8 becomes equal to the full-rated volt-ampere capacity, thereof so that the power factor of the generator is unity, the power factor relay 27 opens its contacts 28 and prevents the contacts 25 of the overcurrent relay 16 from effecting the operation of the tap changer 7. Therefore, as long as the watt demand of the load remains sufficient to cause the watt output of the generator 8 to equal its full-rated volt-ampere capacity, the power factor relay 27 by closing its contacts 28 or 29 controls the tap changer 7 so as to maintain the power factor of the generator at unity.

While I have, in accordance with the Patent Statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a regulating arrangement for use in an alternating current system in which a load is supplied by two parallel-connected sources one of which is a prime mover driven generator, the combination of means responsive to the watt output of one of said sources for controlling the supply of energy to the prime mover of said prime mover driven generator so that a predetermined one of said sources supplies the entire watt demand of the load until it reaches a predetermined value and then the other source supplies the watt demand of the load in excess of said predetermined value, and means responsive to the reactive volt-ampere output of one of said sources for controlling the voltage of one of said sources to cause a predetermined one of said sources to supply the entire reactive volt-ampere demand of the load.

2. In a regulating arrangement for use in an alternating current system in which a load is supplied by two parallel-connected sources one of which is a prime mover driven generator, the combination of means responsive to the watt output of one of said sources for controlling the supply of energy to the prime mover of said prime mover driven generator so that said generator supplies only that portion of the watt demand of the load which is in excess of a predetermined value, and means responsive to the reactive volt-ampere output of one of said sources for controlling the voltage of one of said sources to cause a predetermined one of said sources to supply the entire reactive volt-ampere demand of the load.

3. In a regulating arrangement for use in an alternating current system in which a load is supplied by two parallel-connected sources one of which is a prime mover driven generator, the combination of means responsive to the watt output of one of said sources for controlling the supply of energy to the prime mover of said prime mover driven generator so that said generator supplies only that portion of the watt demand of the load which is in excess of a predetermined value, and means responsive to the reactive volt-ampere output of the source in parallel with said generator for controlling the voltage of one of said sources to cause said generator to supply the entire reactive volt-ampere demand of the load.

4. In a regulating arrangement for use in an alternating current system in which a load is supplied by two parallel-connected sources one of which is a prime mover driven generator, the combination of means responsive to the watt output of one of said sources for controlling the supply of energy to the prime mover of said prime mover driven generator so that said generator supplies only that portion of the watt demand of the load which is in excess of a predetermined value, and means responsive to the reactive volt-ampere output of the source in parallel with said generator to cause said generator to supply the entire reactive volt-ampere demand of the load.

5. In a regulating arrangement for use in an alternating current system in which a load is supplied by two parallel-connected sources one of which is a prime mover driven generator, the combination of means responsive to the watt output of one of said sources for controlling the supply of energy to the prime mover of said prime mover driven generator so that said generator supplies only that portion of the watt demand of the load which is in excess of a predetermined value, means responsive to the reactive volt-ampere output of the source in parallel with said generator for controlling the voltage of one of said sources to cause said generator to supply the entire reactive volt-ampere demand of the load, and means dependent upon the volt-ampere output of said generator reaching a predetermined value for rendering said watt output responsive means inoperative to increase the volt-ampere output of said generator above said predetermined value.

6. In a regulating arrangement for use in an alternating current system in which a load is supplied by two parallel-connected sources one of which is a prime mover driven generator, the combination of means responsive to the watt output of one of said sources for controlling the supply of energy to the prime mover of said prime mover driven generator so that said generator supplies only that portion of the watt demand of the load which is in excess of a predetermined value, means responsive to the reactive volt-ampere output of the source in a parallel with said generator for controlling the voltage of one of said sources to cause said generator to supply the entire reactive volt-ampere demand of the load, and means dependent upon the volt-ampere output of said generator reaching a predetermined value for rendering said reactive volt-ampere responsive means inoperative to control the voltage of the source controlled thereby to increase the volt-ampere output of said generator above said predetermined value.

7. In a regulating arrangement for use in an alternating current system in which a load is supplied by a supply circuit in parallel with a prime mover driven generator, the combination of means responsive to the watt output of said supply circuit, means responsive to the reactive volt-ampere output of said supply circuit, means controlled by said watt output responsive means for varying the energy supplied to the prime mover driving said generator to cause said generator to supply the watt demand of the load in excess of a predetermined value, means controlled by said reactive volt-ampere output responsive means for controlling the voltage of said supply circuit to cause said generator to supply the reactive volt-ampere demand of the load in excess of a predetermined value, means controlled by the output of said generator for modifying said control operations effected by said watt output responsive means and said reactive volt-ampere output responsive means when the volt-ampere output of said generator reaches a predetermined value so that the reactive volt-ampere output of said generator is transferred to the supply circuit while the watt demand of the load is sufficient to maintain the output of said generator equal to said predetermined volt-ampere output of said generator.

8. In a regulating arrangement for use in an alternating current system in which a load is supplied by a supply circuit in parallel with a prime mover driven generator, the combination of means responsive to the watt output of said supply circuit, means responsive to the reactive volt-ampere output of said supply circuit, means controlled by said watt output responsive means for varying the energy supplied to the prime mover driving said generator to cause said generator to supply the watt demand of the load in excess of a predetermined value, means controlled by said reactive volt-ampere output responsive means for controlling the voltage of said supply circuit to cause said generator to supply the reactive volt-ampere demand of the load in excess of a predetermined value, means controlled by the output of said generator for modifying said control operations effected by said watt output responsive means and said reactive volt-ampere output responsive means when the volt-ampere output of said generator reaches a predetermined value so that the reactive volt-ampere output of said generator is transferred to the supply circuit while the watt demand of the load is sufficient to maintain the output of said generator equal to said predetermined volt-ampere output of said generator, power factor means responsive to the power factor of said generator, and means controlled by said power factor means when the watt output of said generator equals said predetermined volt-ampere output of said generator for controlling the energy supplied to the prime mover driving said generator and for controlling the voltage of said supply circuit so as to maintain the power factor of said generator at unity.

9. In a regulating arrangement for use in an alternating current system in which a load is supplied by a supply circuit in parallel with a prime mover driven generator, the combination of means responsive to the watt output of said supply circuit, means responsive to the reactive volt-ampere output of said supply circuit, means controlled by said watt output responsive means for varying the energy supplied to the prime mover driving said generator to cause said generator to supply the watt demand of the load in excess of a predetermined value, means controlled by said reactive volt-ampere output responsive means for controlling the voltage of said supply circuit to cause said generator to supply the reactive volt-ampere demand of the load in excess of a predetermined value, means controlled by the output of said generator for modifying said control operations effected by said watt output responsive means and said reactive volt-ampere output responsive means when the volt-ampere output of said generator reaches a predetermined value so that the reactive volt-ampere output of said generator is transferred to the supply circuit while the watt demand of the load is sufficient to maintain the output of said generator equal to said predetermined volt-ampere output of said generator, and means responsive to the power factor of said generator for modifying said control operations effected by said generator output controlled means so as to maintain the power factor of said generator at a predetermined value after said generator output controlled means has effected the transfer of sufficient reactive volt-amperes to said supply circuit to increase the power factor of said generator to said predetermined value.

10. In a regulating system for use in an alternating current system in which a load is supplied by two parallel-connected sources, means for controlling the power output of one of said sources in response to the power supplied to the system by the other source, means for controlling the reactive volt-ampere output of said one of said sources in response to the reactive volt-ampere output of said other source, and means responsive to the volt-ampere output of said one of said sources for controlling said power and reactive volt-ampere output control means so that said one of said sources supplies power in preference to reactive volt-amperes when the volt ampere output thereof is a predetermined value and the watt output is below a predetermined value.

11. In a regulating system for use in an alternating current system in which a load is supplied by two parallel connected sources, means for controlling the power output of one of said sources in response to the power supplied to the system by the other source, means for controlling the reactive volt-ampere output of said one of said sources in response to the reactive volt-ampere output of said other source, and means responsive to the volt-ampere output and power factor of said one of said sources for controlling said power and reactive volt-ampere output control means so that when the volt-ampere output of said one of said sources equals a predetermined value, the volt-ampere output is maintained at the predetermined value by transferring reactive volt-amperes from said one of said sources until the watt output thereof equals said predetermined value of volt-amperes.

12. In a regulating system for use in an alternating current system in which a load is supplied by two parallel connected sources, means for controlling the power output of one of said sources in response to the power supplied to the system by the other source so as to maintain the power output of said other source below a predetermined value, means for controlling the reactive volt-ampere output of said one of said sources in response to the reactive volt-ampere output of said other source so as to maintain the reactive volt-ampere output of said other source below a predetermined value, and means responsive to the volt-ampere output of said one of said sources exceeding a predetermined value for controlling said power and reactive volt-ampere output control means so that said other source supplies reactive volt-amperes in preference to watts.

HERMAN BANY.